INVENTOR.
ALBERT E. SCHULER
BY
W. E. Thibodeau & A.W. Dew
ATTORNEYS

July 11, 1961  A. E. SCHULER  2,992,302
PRESSURE BALANCE

Filed Oct. 30, 1956  3 Sheets-Sheet 2

INVENTOR.
ALBERT E. SCHULER
BY
W. E. Thibodeau + A. W. Dew
ATTORNEYS

July 11, 1961 A. E. SCHULER 2,992,302
PRESSURE BALANCE

Filed Oct. 30, 1956 3 Sheets-Sheet 3

INVENTOR.
ALBERT E. SCHULER
BY
W. E. Thibodeau + A. W. Dew
ATTORNEYS

United States Patent Office 2,992,302
Patented July 11, 1961

2,992,302
PRESSURE BALANCE
Albert E. Schuler, Huntsville, Ala., assignor to the United States of America as represented by the Secretary of the Army
Filed Oct. 30, 1956, Ser. No. 619,368
4 Claims. (Cl. 200—81.5)
(Granted under Title 35, U.S. Code (1952), sec. 266)

The invention described herein may be manufactured and used by or for the Government for governmental purposes without the payment of any royalties thereon.

This invention relates to a pressure regulating arrangement, and more specifically to an arrangement for accurately regulating fluid pressure at any selected value.

An object of this invention is to provide a pressure regulator which regulates fluid pressure to a high degree of accuracy, and which may be used, for instance, as a pressure reference or calibration standard.

It is a further object of this invention to provide a pressure regulator wherein the desired pressure may be achieved by the use of closely calibrated forces, such as predetermined weights. Still further objects and many attendant advantages of this invention will become apparent to one skilled in the art from a reading of the following detailed description of several physical embodiments of the invention.

Figure 1:
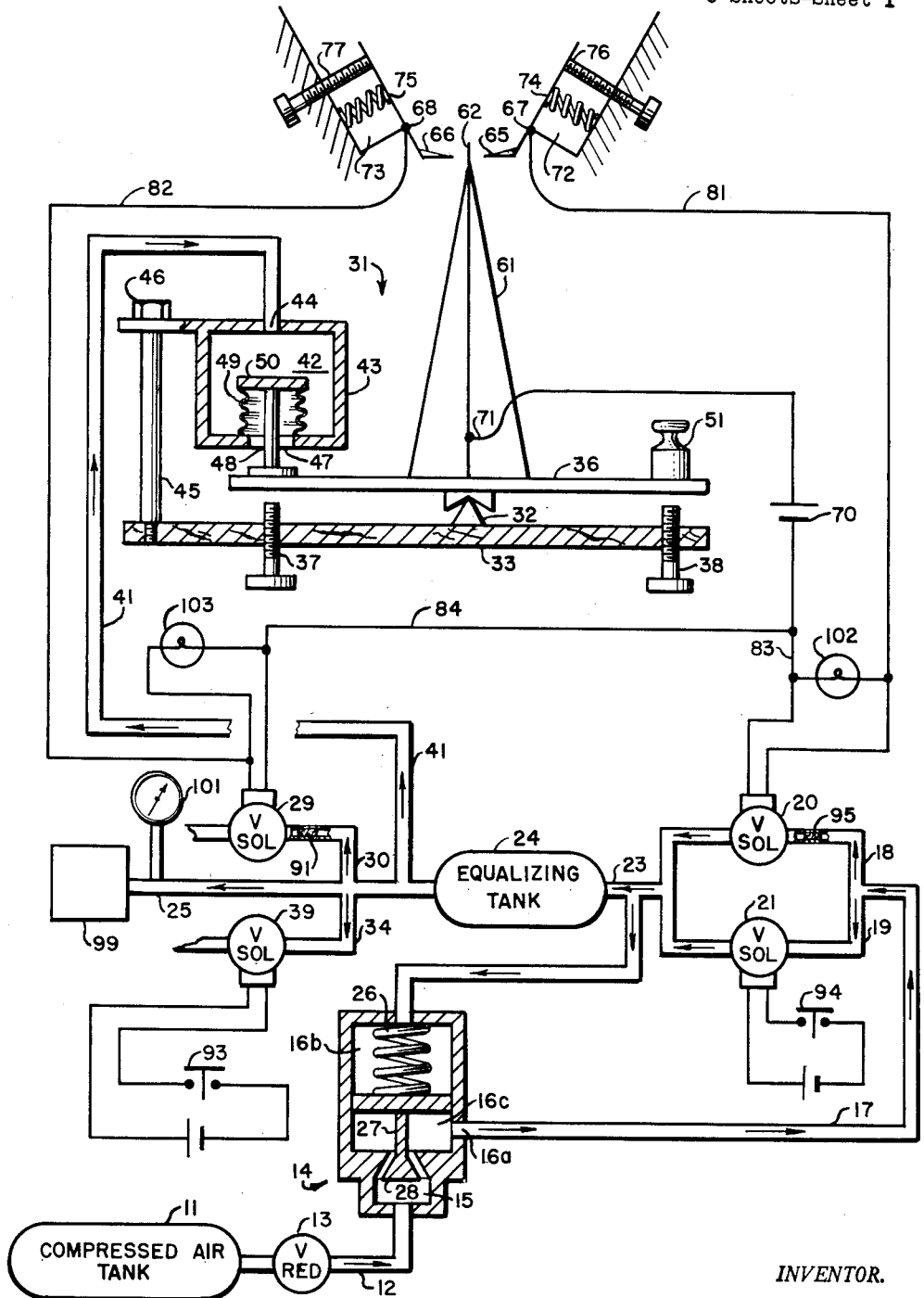
FIGURE 1 is a schematic diagram illustrating one embodiment of the invention.

As shown in FIGURE 1, air or other fluid under pressure is supplied by a suitable source, such as compressed air supply 11 through line 12 and a suitable reduction valve 13 to the inlet 15 of a pressure regulator 14. The function and purpose of the pressure regulator 14 will be described in more detail as this description proceeds.

From the outlet 16a of solenoid valve supply pressure regulator 14, the air or other gas flows through line 17 into parallel lines 18 and 19. The air or gas flows thence through either or both of solenoid valves 20 and 21, respectively, in lines 18 and 19, into line 23 and equalizing tank 24 and thence out into the final pressure regulated outlet line 25.

Suitable pressure sensing apparatus is provided for detecting and measuring the pressure in equalizing tank 24. In the embodiment illustrated in FIGURE 1, this apparatus takes the form of a force balance device indicated generally at 31. The force balance device 31 senses the pressure in the equalizing tank 24 via line 41, sums the pressure into a force, compares this force with a predetermined desired force or weight, and if a difference exists, the force balance device 31 gives an output, in the instant example in the form of an electrical signal, which opens one or the other of the normally closed solenoid valves 20 or 29, in order to let gas in or out and thus to provide more or less pressure in the equalizing tank 24.

The force balance device as illustrated in FIGURE 1 takes the form of a pressure balance having a fulcrum 32 secured to a suitable base 33, on which fulcrum 32 is supported a beam 36 for limited angular movement about its axis at the knife-edge support point thereof. The beam 36 is limited to a desired angular movement by suitable means, such as adjustable stop screws 37 and 38, which are threadedly engaged with tapped openings formed either in base 33 or some part fixedly secured thereto.

The pressure in equalizing tank 24 is transmitted through line 41 to force summer 42, where it is transformed into a force for comparison with weight 51 supported on beam 36 at a predetermined distance from the fulcrum 32.

The force summer 42 illustrated in FIGURE 1 comprises a cylindrical housing 43 suitably connected through an opening 44 in the upper end thereof to line 41. The housing 43 is fixedly secured with respect to the base 33 as through attachment to supporting pillar 45 which is fixedly mounted on base 33. The housing 43 may if desired be removably mounted on supporting pillar 45 as by a securing nut 46.

Attached to the housing 43 about the inner circumference of the opening 47 in the bottom of the housing 43 is a bellows 49. The upper end of the bellows is closed by the cover plate 50, which is secured to the upper end of plunger 48. The base end of plunger 48 rests upon, or may be secured to, the beam 36 at a predetermined distance from the fulcrum point for the beam. It will thus be seen that pressure existing in equalizing tank 24 will be transmitted through line 41 to the interior of housing 43, where it is summed into a force by plate 50, which force is transmitted to the beam 36 through the medium of plate 50 and plunger 48. The product of this force and the lever arm on the left side of beam 36 is compared with the force-lever arm product on the right hand side of beam 36 which is determined by the preselected dead weight 51.

A suitable balance sensing device is provided in the form of a pointer 61 which is secured to the balance beam 36 and extends upwardly between a pair of contacts 65 and 66. The pointer 61 is constructed in a pyramidal shape from a pair of intersecting vertical sheets of suitably strong material in order to give a rigid, yet light, construction. At the upper end of the pointer 61 is mounted a contact blade 62 which is midway between contacts 65 and 66 when the beam 36 is balanced. The contact blade 62 is preferably made of a highly conductive contact material such as silver alloy. The pointer 61 affords an electrical connection between one side of a source of E.M.F., such as battery 70, and contact blade 62. This may be accomplished either by making the pointer 61 of electrically conductive material and insulating the pointer from the beam 36, or by providing an electrical conductor on the pointer 61 between the conductor 71 and the contact blade 62. In order to prevent hindrance of movement of the pointer 61 the conductor 71 is preferably connected to the pointer 61 or other conductor on the pointer near or at the lower end of the pointer 61, over the fulcrum contact line.

In order to prevent damage to the contact blade 62 or contacts 65 and 66, the contact arms 65 and 66 are pivotally mounted as indicated at 67 and 68 on suitably fixed supports 72 and 73. The contact arms 65 and 66 are resiliently biased inwardly toward the pointer contact blade 62 by a pair of light springs 74 and 75. In order to properly adjust the contact arms 65 and 66 to equal distance points from pointer contact arm 62 at balance position, there is provided a pair of adjustment screws 76 and 77 which abut the upper ends of contact arms 65 and 66 and thus serve as adjustable stops therefor.

The contact arms 65 and 66 are suitably connected as through conductors 81 and 82 to solenoid valves 20 and 29 respectively. The other sides of the valves 20 and 29 are connected by conductors 83 and 84 to the other side of battery 70. Thus, movement of pointer 61 in a clockwise direction closes a circuit which actuates solenoid valve 20, whereas movement of pointer 61 such that pointer contact blade 62 is in contact with contact arm 66 causes completion of the energization circuit for solenoid valve 29 and the consequent actuation thereof to open the same.

The flow of gas through solenoid valves 20 and 29 is restricted by the use of porous metal discs 95 and 91, mounted respectively in conduits 18 and 30. These porous metal discs 95 and 91 together with equalizing tank 24 serve to give a smooth operation to the system during normal operation thereof.

For initial starting of operation of the system, or for change of pressure by the changing of weight 51, there are provided two additional solenoid valves 21 and 39, the conduits 19 and 34 respectively which are less restricted and which thus permit faster pressure changes to bring the system quickly to a state near equilibrium. Solenoid valves 21 and 39 are manually operated as by switches 93 and 94 which are energized by batteries 93a and 94a respectively.

Prior to initial operation of the system the force balance device 31 is placed or is adjusted to equilibrium with no weight 51 on the balance beam 36 and with only normal atmospheric pressure in line 41. This may be accomplished readily by making the right and left portions of beam 36 of such dimensions and weight that the unweighted right-hand side balances out the force summing left-hand side or by the addition of necessary dead weight on either side thereby achieving balance or equilibrium at zero pressure. The adjustable stop screws 37 and 38 are so adjusted as to permit the desired angular movement of the beam 36, which movement in normal operation is very small.

To initiate operation of the system whereby an instrument or other device generally indicated at 99 is to be pressurized, the operator places a suitable weight 51 on the right-hand side of the beam 36. This weight 51 will be selected such that the force-lever arm product on the right-hand side will require the desired pressure in line 41, in the equalizing tank 24, and thus line 25 and instrument 99 in order to give a force on plunger 48 which will place the beam 36 and pointer 61 in equilibrium. The placing of the weight 51 on the beam 36 thus causes an initial unbalance of the beam and pointer 61 in a clockwise direction, resulting in the energization of solenoid valve 20 through the closing of contact blade 62 and contact arm 65. The energization and consequent opening of solenoid valve 20 permits the afterflow through lines 17 and 18 and porous disc 95 into line 23, equalizing tank 24, line 41, and instrument 99. Due to the porous disc 95, or other suitable restriction in the line 18, it would take a considerable length of time to bring the pressure in the system up to the desired value, and thus to place the pressure balance device 31 into equilibrium. To avoid this time lag the operator may press switch 94, energizing valve 21, and thus permit a quick pressure change in the instrument 99 and all intermediate conduits. Signal lamps 102 and 103 operated parallel with the solenoid valves 20 and 29 will indicate when balance is reached and switch 94 can immediately be released to prevent overshoot. This requires close attention of the operator and can be facilitated by connecting a suitable pressure gage 101 to line 25. The pressure or change in pressure in line 25 may thus be watched by the operator and thus the operator may release manual switch 94 to open position just prior to reaching the desired pressure. The automatic pressure regulation through means of force balance device 31 and solenoid valve 20 will bring the pressure in the system to the desired value, and, thereafter, the pressure will be automatically maintained at the desired level by action of this force balance device 31 and solenoid valves 20 and 29. Thus any small leakage or excess build-up of pressure in the line 25 and instrument 99 causes movement of the pointer 61, and consequently the contact 62 closes (through contact 65 or 66) the circuits energizing solenoid valves 20 or 29 respectively which adds or releases air until the forces from summing device 42 and weight 51 are balanced. At equilibrium the pointer 61 and contact blade 62 will be out of contact with both contact arms 65 and 66.

It will readily be apparent that should it be desired to quickly decrease the pressure in the system the solenoid valve 39 may be energized by closing of manual push button switch 93. This would be the case were it desired to pressurize the instrument 99 at a considerably decreased pressure and where there is used a smaller weight 51, or other force, than had previously existed on the right-hand side of beam 36.

Should the pressure in line 41 be brought up to a point such that the force-lever arm product exerted on the left-hand side of the balance beam 36 overbalance the right-hand force-lever arm product, the pressure release solenoid valve 29 will be opened through the closing of contact blade 62 and contact arm 66. If the overshoot or pressure in the line does not exceed the desired pressure by a substantial amount, normal automatic operation may be permitted with the pressure in the system being decreased through the escape of gas through porous disc 91 and solenoid valve 29. The solenoid valve 29 will continue open until the pressure in force summing device 42 is reduced to the desired value which will result in equilibrium in the pressure balance system 31.

The solenoid valve auxiliary pressure regulator 14 is utilized in order to provide substantially controlled flow through the solenoid valve 20 at all desired pressure levels. This regulator 14 has a spring 26 which exerts a bias on plunger 27. The force of spring 26 together with any pressure existing in the upper chamber 16b tends to keep plunger 27 down with its lower valve end 28 in the open position. Pressure from the compressed air supply 11 exerts an upward force on the plunger 27 which tends to close the lower valve end 28, however, the spring 26 exerts more downward force than the initial force by the supplied pressure alone on this lower valve end 28 and thus initially holds the valve open. It will thus be apparent that the plunger 27 will remain open in initial starting, and will periodically open thereafter, until the pressure in the lower chamber 16c and line 17 is sufficiently large to cause a slightly greater upward force on the lower surface of plunger 27 than the downwardly opposing force exerted on the upper surface of the plunger 27 through the combined effects of the spring 26 and the pressure in line 23. Thus it will be seen that the pressure differential between line 17 and line 23 will be substantially constant. Only a slight pressure differential increase occurs with increasing pressure in chamber 16c. In this manner it can be seen that the pressure in line 17 is a function of the pressure in line 23 and thus the flow rate through valve 20 is also a function of the pressure in line 23 and in the entire system.

Figure 3:
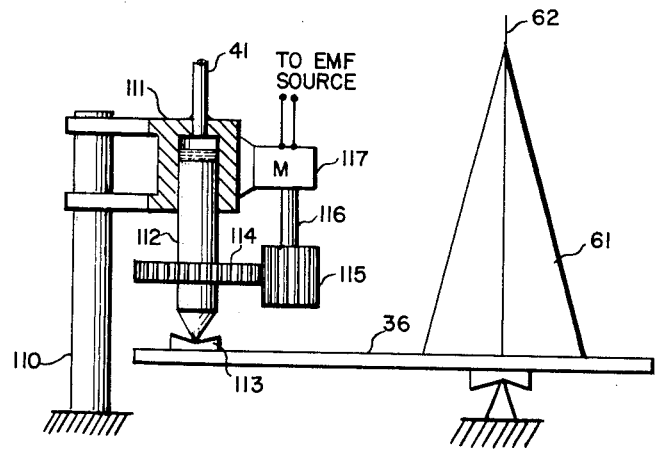
FIGURE 3 illustrates a modification of the invention.

A modification of the force summing device is illustrated in FIGURE 3. In this embodiment a supporting pillar 110 has removably mounted thereon a cylinder 111 open at its lower end. A piston 112 is fitted with very close tolerance within the cylinder opening, and is rotatably held in the cylinder. The lower conical end of the piston 112 rests upon the upper carved out surface of a bearing supporting block 113 which is fixedly mounted on beam 36. Secured to the piston 112 for rotation therewith is a gear 114 which meshes with a spline gear 115. The spline gear 115 is driven through shaft 116 by motor 117 which is suitably mounted on the cylinder 111. The pressure line 41 is coupled with a suitable fitting to the top of cylinder 111 and is thus in fluid connection with the interior of the cylinder. In order to prevent leakage of the gas between the inner walls of the cylinder 111 and the piston 112, a small amount of oil may be provided in the interior of the chamber formed in the cylinder 111. The small amount of leakage, which is very minute, serves to lubricate the adjacent surface of the piston in the cylinder 111. This modification is particularly advantageous in that it avoids the effects of hysteresis which are encountered to some degree in a system utilizing a bellows. In operation of this modification the motor 117 is run during the entire operation, and the pressure in the line 41 is thus immediately transmitted through the rotating piston 112 to the bearing block 113 and balance beam 36, inasmuch as substantially no static friction need be overcome.

Figure 4:
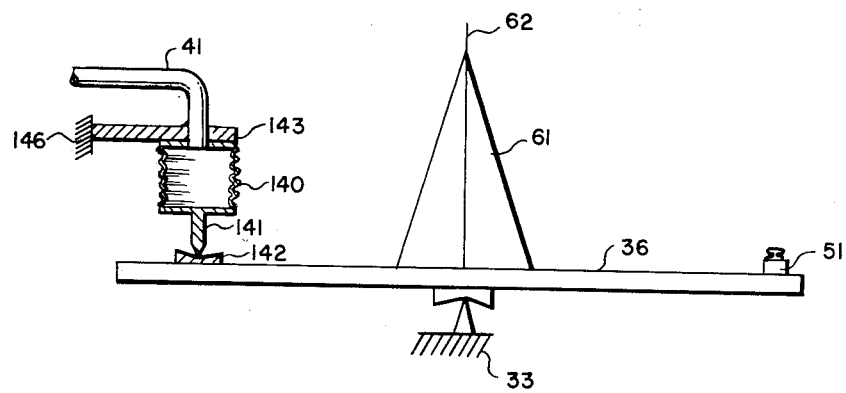
FIGURE 4 illustrates a further modification of the invention.

In FIGURE 4 there is shown a further modification of the invention, wherein the bellows 140 is pressurized inside in lieu of outside pressurization as in the embodiment shown in FIGURE 1. As in the embodiment of FIGURE 1, the pressure in the line 41 is summed into a force in the bellows 140, which force is applied downwardly through the lower end 141 of the bellows to a pressure block 142 and thus to balance beam 36. The upper end 143 of the bellows is held against movement of being fixedly mounted to a suitable support 146 which may be secured to the base 33. With this internally pressurized bellows arrangement the wall of the bellows will tend to bow or bulge outwardly under high pressures, and the use of this modification is thus limited to low pressure work.

Figure 5A:
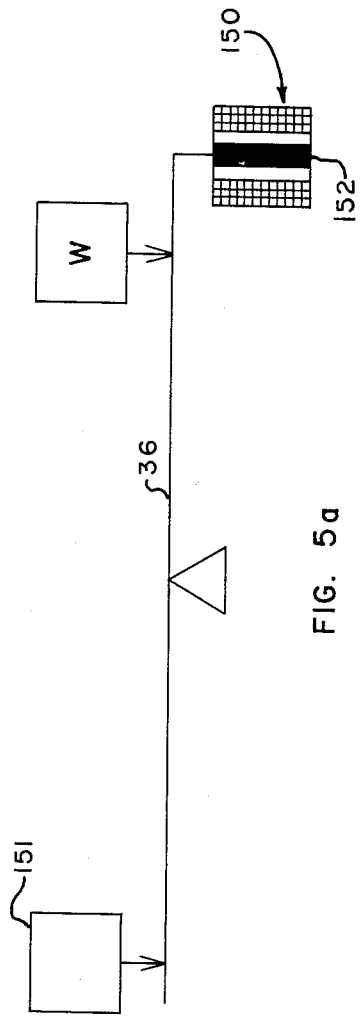
FIGURE 5 illustrates still another modification of the invention.

FIGURE 5a illustrates another modification of the invention with a differential transformer replacing the magnifying pointer 61 utilized in the previous illustrated embodiments. In this embodiment any one of the force summing devices illustrated in FIGURES 1, 3, and 4 may be utilized as the force summing device generally designated as 151 in this embodiment. The weight is generally indicated at W and the balance beam is indicated at 36.

Figure 5B:
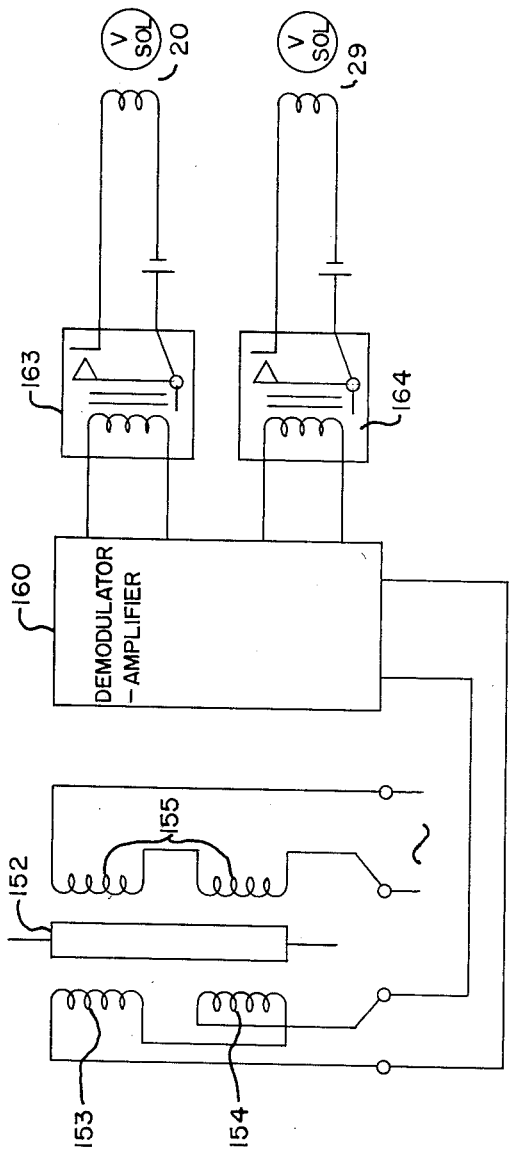
Figure 2:
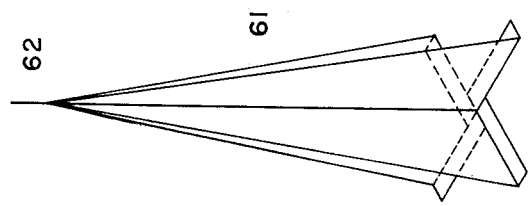
FIGURE 2 illustrates in enlarged detail the pointer contact shown in FIGURE 1.

The differential transformer 150 makes a highly sensitive detector for movement of the beam 36, and, as shown in FIGURE 5b, may be used in conjunction with a phase sensitive demodulator-amplifier 160 of common construction (such as a ring modulator) to actuate a pair of relays 163 and 164, depending upon the phase of the output of the differential transformer 150. The relays 163 and 164 in turn actuate solenoid valves 20 and 29. The iron core 152 of the differential transformer is secured to and movable with the beam 36. In the balanced position the core 152 is symmetrical to the two secondary coils 153 and 154. An A.C. voltage is applied across the primary coils 155, and in the balance position the same volage is thus induced in each of secondary coils 153 and 154. These coils 153 and 154 are in opposition to each other and thus in the balance position the induced voltages cancel out with a resultant zero output into demodulator-amplifier 160. Unbalance of the beam 36 either clockwise or counterclockwise causes an output to amplifier 160 with the phase depending upon the direction of the unbalance. The connection between demodulator amplifier 160 and the relays 163 and 164 is such that for clockwise unbalance the relay 163 and consequently solenoid valve 20 are energized, with relay 164 and solenoid valve 29 being energized upon counterclockwise unbalance.

Obviously, many modifications of the physical embodiments of my invention as illustrated are possible and will be apparent to those skilled in the art without departing from the scope of the invention, and it is to be understood that the invention is not to be limited by these illustrative examples, but only by the scope of the appended claims.

I claim:
1. A balanced beam switch device comprising a base with a knife edge, a beam in balance relation with said knife edge having a pointer extending therefrom, beam balance means for applying a constant force and variable forces to opposite ends of said beam respectively for corresponding opposite rotations thereof, said variable forces means including a housing secured to said base for communication with a source of fluid, a piston disposed in said housing and secured to said beam and bellows secured between said piston and said housing for application of the fluid to said piston for opposite rotations of said beam responsive to pressures of the fluid above and below a predetermined value, and a pair of arms secured to said base for respective contacts with said pointer, responsive to the rotations.

2. A balanced beam pressure sensitive switch device comprising a base with a knife edge, a beam in balance relation with said knife edge and having an arm extending therefrom, contact means positioned for and operatively dependent upon engagement with said arm, said arm being responsive to unbalance of said beam for engagement with said contact means, first beam balance means for applying a constant force to one end of said beam to urge said beam in one direction, second beam balance means for applying variable forces to the other end of said beam to urge said beam in a direction opposite the direction of urging of said first beam balance means, said second beam balance means consisting of a housing, a piston moveable in said housing, said piston being in engagement with said beam and being responsive for movement to a source of variable pressure communicating therewith, and means for rotating said piston about its vertical axis.

3. The switch device of claim 2 wherein said first beam balance means consists of a dead weight.

4. The switch device of claim 2 wherein said piston rotating means consists of a motor secured to said base and geared to said piston.

References Cited in the file of this patent

UNITED STATES PATENTS

| | | |
|---|---|---|
| 673,922 | Nolan | May 14, 1901 |
| 937,721 | Schulte | Oct. 19, 1909 |
| 1,501,412 | Ingram | July 15, 1924 |
| 1,743,545 | Helpbringer | Jan. 14, 1930 |
| 1,869,791 | Wright | Aug. 2, 1932 |
| 2,121,433 | Kettunen | June 21, 1938 |
| 2,167,517 | Korber | July 25, 1939 |
| 2,217,087 | Whitenack | Oct. 8, 1940 |
| 2,274,254 | Newton | Feb. 24, 1942 |
| 2,371,040 | Fisher | Mar. 6, 1945 |
| 2,376,144 | Levine | May 15, 1945 |
| 2,688,253 | Markson | Sept. 7, 1954 |
| 2,750,465 | Yowell | June 12, 1956 |
| 2,751,457 | Donaldson | June 19, 1956 |
| 2,783,333 | Witherspoon | Feb. 26, 1957 |
| 2,789,176 | Mercier | Apr. 16, 1957 |

FOREIGN PATENTS

| | | |
|---|---|---|
| 58,171 | Denmark | Nov. 4, 1940 |